May 16, 1944.　　　D. B. ROSSHEIM　　　2,348,926
APPARATUS FOR DETERMINING STRESSES IN PIPE ARRANGEMENTS
Filed July 8, 1941　　　3 Sheets-Sheet 1

DAVID B. ROSSHEIM
INVENTOR

May 16, 1944.  D. B. ROSSHEIM  2,348,926
APPARATUS FOR DETERMINING STRESSES IN PIPE ARRANGEMENTS
Filed July 8, 1941  3 Sheets-Sheet 2

DAVID B. ROSSHEIM
INVENTOR
BY Virgil F. Davis
and William Klabunde
ATTORNEYS

Patented May 16, 1944

2,348,926

UNITED STATES PATENT OFFICE 2,348,926

APPARATUS FOR DETERMINING STRESSES IN PIPE ARRANGEMENTS

David B. Rossheim, Teaneck, N. J., assignor to The M. W. Kellogg Company, New York, N. Y., a corporation of Delaware Application July 8, 1941, Serial No. 401,458

5 Claims. (Cl. 73—51)

This invention relates to apparatus for determining stresses in piping arrangements, and has particular application to the testing of scaled models of piping for high-temperature, high-pressure installations.

In pipe-line construction for use under severe conditions of temperature and pressure, such as that encountered in oil refinery, steam-line, and processing operations, it is of utmost importance to accurately design the pipe to withstand the severe stresses to which it is subjected as a result of extreme temperature and pressure changes. The restraint imposed on such pipe when its ends are anchored to fixed apparatus sets up severe stresses in the pipe walls and fittings. In two-dimensional structures, unrestrained expansion or contraction would ordinarily tend to produce translatory displacement of the unanchored end. The problem of calculating such translatory movement is not particularly involved. In three-dimensional structures, however, that is, where the pipe lies in more than one plane, the problem of calculating mathematically the forces and stresses to which the structure is subjected becomes involved, by reason of the fact that not only are forces exerted, but moments are created tending to cause angular movement at the points of anchorage.

Three-dimensional piping systems in which a plurality of side branches are attached to a main line are not at all uncommon. It is in the calculation of the various stresses set up in installations of this type that the present invention finds its most important application, although, obviously, it may be used to calculate stresses in systems of simpler design.

The principal object of my invention is to devise an apparatus for accurately determining the stresses and reactions of a piping system on its supporting structure resulting from expansion due to heating. These reactions occur at the various points of support, such as the intermediate hangers and clamps and the ends where the pipe is connected to fixed pieces of apparatus. They are measured as forces tending to produce translatory movement and moments tending to produce rotation at the points of anchorage.

A further object of my invention is to provide apparatus for readily reproducing and determining on a scaled model forces and moments equivalent to those anticipated in the proposed pipe structure. In accordance with the present invention, a supporting apparatus is provided on which a previously prepared scaled model of the pipe line may readily and accurately be supported in the manner proposed for the contemplated pipe-line, and be subjected to similar stresses. The pipe model is firmly held at its anchorage points by measuring heads supported on a suitable framework which is readily adjustable to accommodate even the most complex piping system.

Another object is to provide an improved force-measuring head adapted to receive the pipe-end to be tested and to determine the reactions thereon in consequence of strains produced on the model comparable to those which would occur on the proposed pipe-line as a result of expansion or contraction due to heat changes. The reactions are to be resolved into the forces in both directions along all three coordinate axes and the moments about the same axes. The force measurements are to be taken simultaneously or successively without any resetting of the apparatus.

These and other objects are effected by my invention, as will be apparent from the following description and claims taken in connection with the accompanying drawings forming a part of this application, in which:

Figure 1:
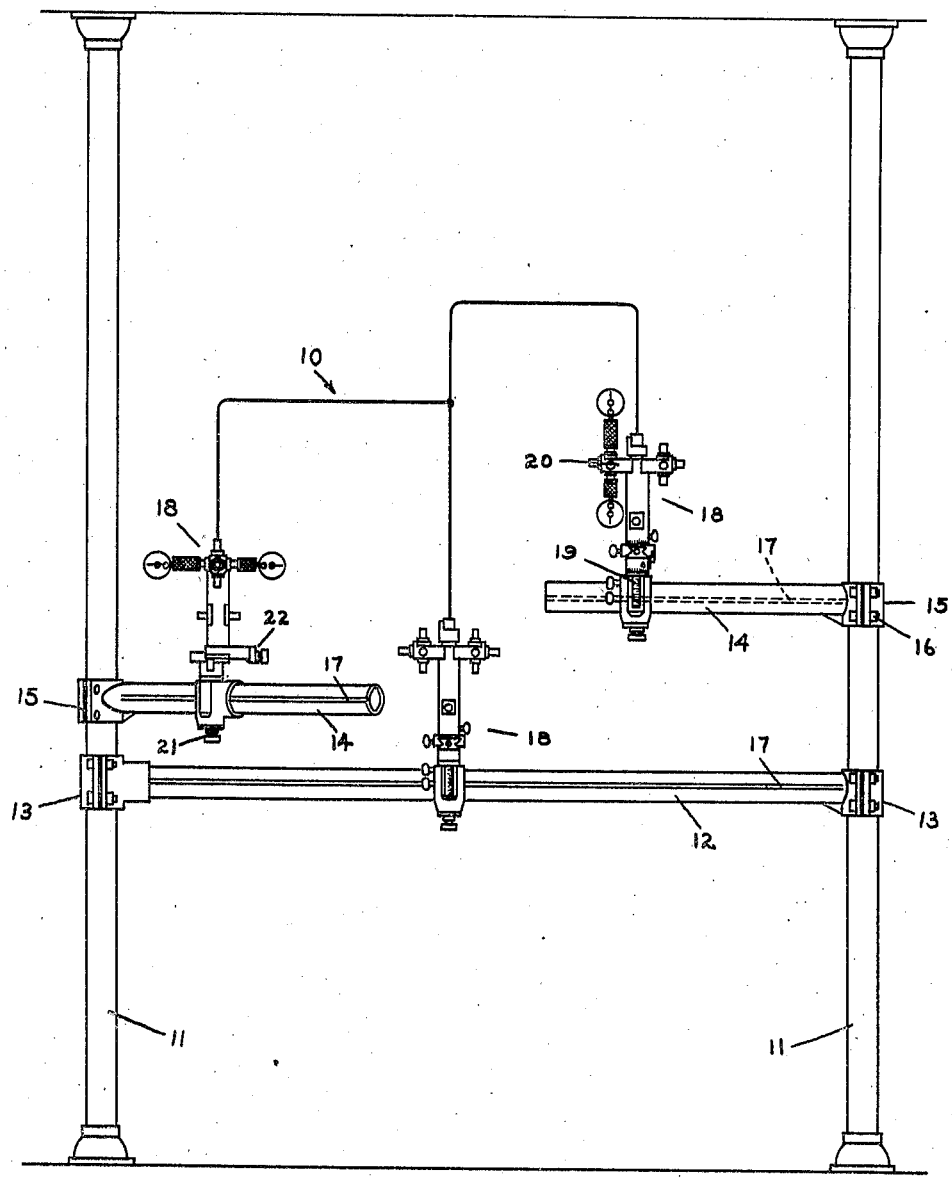
Fig. 1 is a view in elevation of the complete apparatus with a scaled model of three-dimensional piping supported for testing.

Referring to Fig. 1 of the drawings, the pipe-model 10 is supported on a framework which comprises a pair of spaced, parallel uprights 11 connected by a cross-bar 12 to form a rigid H-frame. The cross-bar 12 has split clamps 13 at each end to permit its vertical adjustment on the uprights. Lateral bars 14 are attached at one end by split clamps 15 to the uprights 11. The bars 14 are vertically adjustable along, and rotatable in a horizontal plane about, their respective uprights. Bolts 16 serve to hold the cross-bar and lateral bars rigidly in the desired position. The number and positioning of the lateral bars in the drawings are merely illustrative, a sufficient number thereof being placed on either upright, above or below the cross-bar, to accommodate the various branches of the piping system to be tested. The uprights and horizontal bars of the framework are preferably, though not necessarily, formed from lengths of seamless tubing. Cross-bar 12 and lateral bars 14 are longitudinally splined, as indicated at 17, preferably at an end of their vertical and horizontal diameters.

Adjustably mounted on the horizontal members of the frame, that is, members 12 and 14, are a plurality of devices, generally indicated at 18, for performing the combined functions of rigidly supporting the pipe model, of straining in predetermined manner various anchored parts of the pipe, and of determining the reactions at all anchored parts in consequence of such strains.

Figures 2, 4, 5:
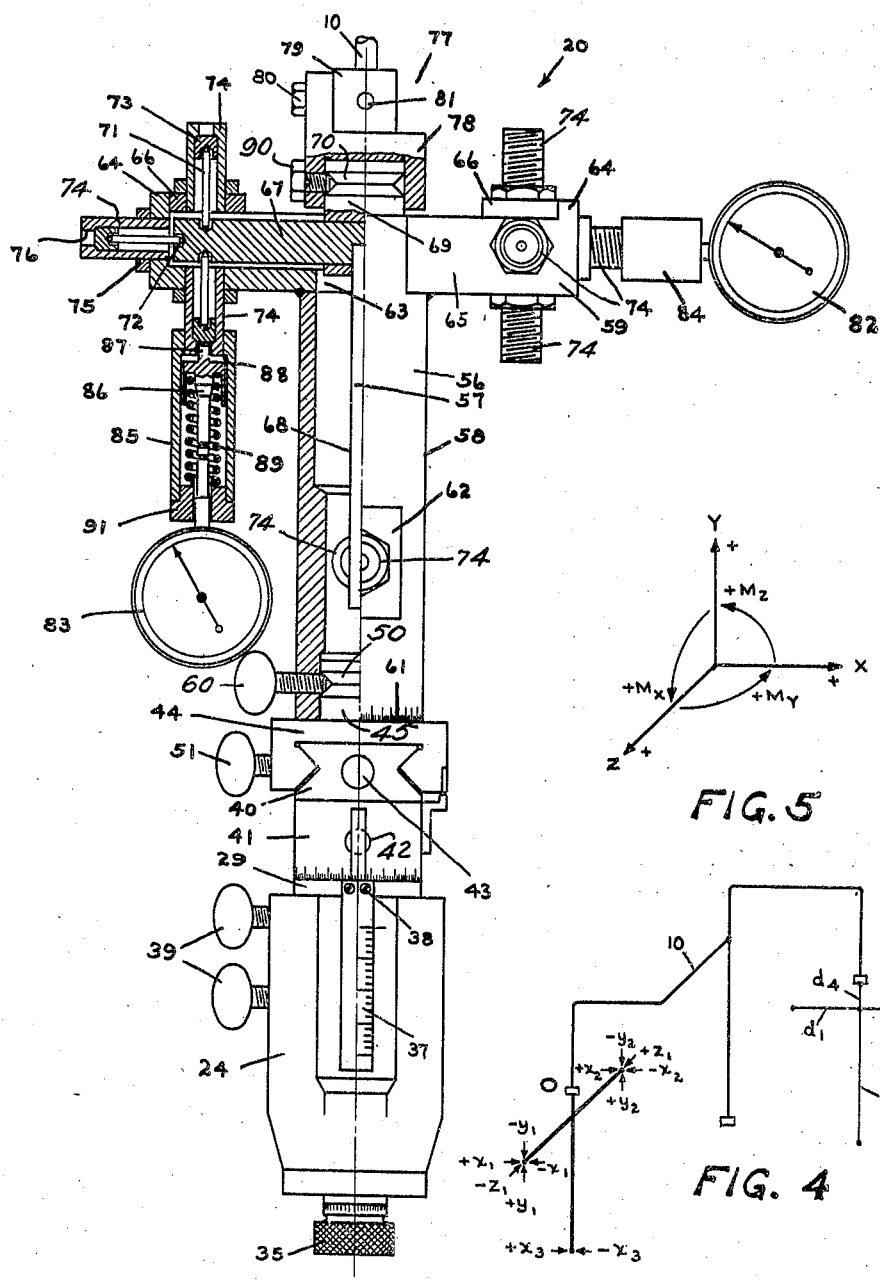
Fig. 2 is an enlarged view in elevation of the force-measuring head and the sliding head shown as a unit removed from the supporting frame.
Fig. 4 is a diagrammatic view showing the force components at each end of the pipe model illustrated in Fig. 1.
Fig. 5 is a diagrammatic view showing the moments to be considered with relation to each coordinate axis.
Figure 3:
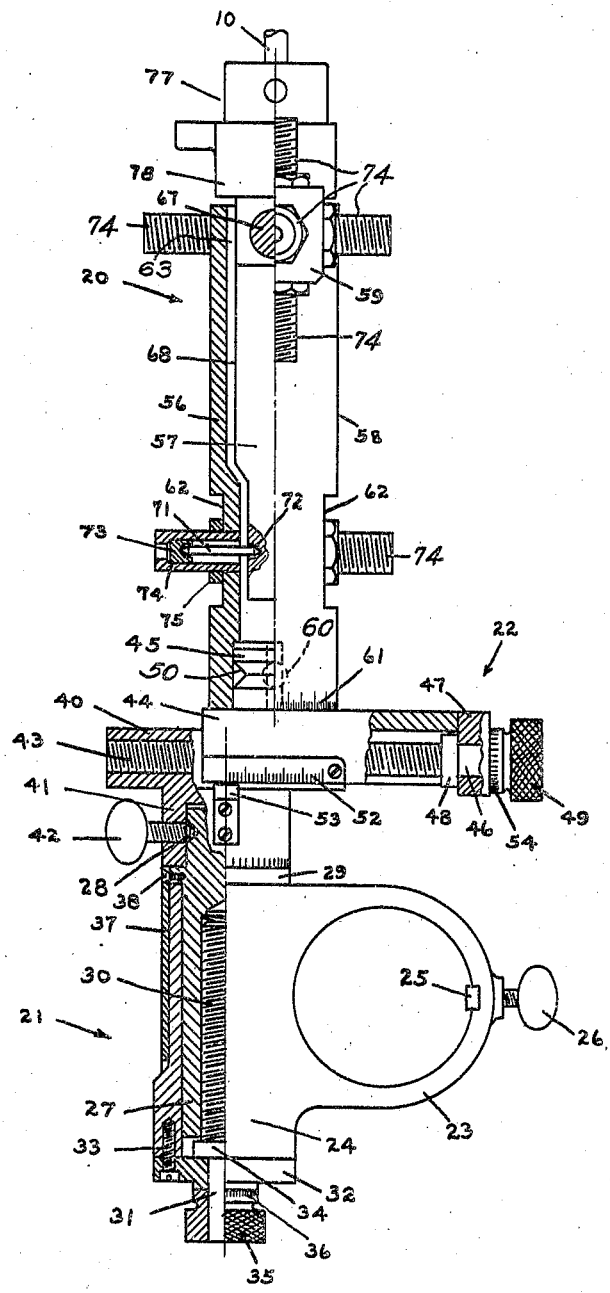
Fig. 3 is a side view of the apparatus shown in Fig. 2.

Device 18, which is clearly shown in Figs. 2 and 3, is a combination of movement head 19, which is clamped to the frame, and measuring head 20, which supports and determines the stresses within the model pipe 10. Although devices 18 have been illustrated in a vertical position, with the measuring head mounted on top of the movement head, it is to be understood that they may be placed also horizontally on the frame. However, to simplify the description, the device will be considered in a vertical position.

Movement head 19 combines a vertical feed 21 and a horizontal feed 22 mounted thereon for relative angular adjustment.

Vertical feed 21 includes a sleeve clamp 23 for attachment to the horizontal members of the frame and a side block 24 integral therewith for supporting the various elements of the feeding mechanism. Sleeve 23 is splined on the side to receive a feather 25 adjustable radially by thumb-screws 26 in the wall of the sleeve. Feather 25 fits in splines 17 of cross-bar 12 and lateral bars 14 to prevent rotation of the sleeve clamp. The clamp is movable longitudinally along its supporting bar, and may be clamped in its desired position by tightening thumb-screws 26.

Block 24 at the side of sleeve clamp 23 is bored vertically to receive for longitudinal movement a post 27. A spline and feather, not shown, is provided to prevent rotation of the post 27. Post 27 has a circumferential V-groove 28 adjacent its upper end and a flange 29 below the groove to limit downward movement of the post. Post 27 is drilled from the bottom and tapped to receive a feed-screw 30 having an extended head portion 31 freely rotatable in a journal plate 32 secured to the lower end of the block by screws 33. Feed-screw 30 has a thrust-collar 34 bearing against the top of journal plate 32. A hand-knob 35 is secured to the lower end of the feed-screw 30. A reference mark is placed on journal plate 32, and hand-knob 35 is circumferentially graduated, as shown at 36, to indicate the longitudinal displacement of post 27. The circumference of the knob is divided into fifty parts, each division representing a thousandth of an inch travel of the post 27.

The side of block 24 is grooved longitudinally from its upper edge downward a portion of its length to form a vertical guideway for a graduated slide 37 attached at its upper end to the edge of flange 29 of post 27, as by screws 38. A reference mark on the block adjacent the slide serves to indicate the longitudinal displacement of post 27. Each graduation represents one full turn of knob 35, or five hundredths of an inch travel of the post 27. When post 27 is in its desired position, it may be rigidly clamped, as by thumb-screws 39 set in the side of block 24.

Horizontal feed 22 is mounted for angular adjustment on the upper end of post 27. It includes a guide block 40 having a depending cap portion 41 adapted to fit over the head of post 27 and bear on the flange 29. A thumb-screw 42 in the side of the cap 41 extends into V-groove 28. The guide block 40 is rotatable on post 27, and may be locked in any desired position by the thumb-screw 42. The lower perimeter of cap 41 is graduated in degrees, so that by reference to a mark placed on the side of flange 29 the guide block 40 may be rotated in a horizontal plane through any desired angle.

Guide block 40 has a horizontal V-groove on each side and a threaded bore to receive a feed-screw 43. The top of guide block 40 forms a horizontal bearing surface for a sliding plate 44. Plate 44 is in the form of an inverted channel and has its inner side walls tapered to fit the V-grooves of guide block 40. A short post 45 having a circumferential V-groove 50 projects upwardly from the top of plate 44. Post 45, in its horizontal path of movement, is alignable with post 27.

Feed-screw 43 has an extended head portion 46 freely rotatable in a bearing piece 47 secured across one end of the channel 44. A thrust collar 48 at the inner side of the bearing piece and a hand-knob 49 on the end of the feed-screw connect the plate and screw for concurrent longitudinal displacement. The sliding plate 44 may be clamped in its desired position by means of thumb-screws 51 set in the side of the channel and adapted to bear against the grooved portion of guide block 40. A scale 52 is attached along the lower outer edge of plate 44. A reference mark is placed on a bracket 53 attached to the side of cap 41. Each graduation of the scale 52 represents one full turn of the knob 49, or five hundredths of an inch horizontal displacement of the post 45. Knob 49 is circumferentially graduated at 54, and a reference mark is placed on bearing piece 47. Each graduation on knob 49, of which there are fifty, represents a thousandth of an inch horizontal displacement of post 45.

The measuring head 20 is attached to post 45. Measuring head 20 comprises a T-housing 56 supporting internally a T-member 57. Housing 56 includes a tubular stem portion 58 slotted across its upper end to receive a head portion 59 which is in the form of a channel having closed ends. The two pieces are rigidly joined, as by welding.

The lower end of tube 58 fits over post 45 of the sliding plate 44 and is adjustably secured thereto by a thumb-screw 60 set in the side of the tube and engaging at its inner end the circumferential V-groove 50.

Graduations 61 about the lower periphery of tube 58 serve to indicate the degree of angular displacement of the measuring head 20 relative to the movement head 19 by reference to a mark placed on the upper surface of the sliding plate 44. When the measuring head 20 has been set in its desired position, the thumb-screw 60 is turned to lock it in place.

The head portion of T-member 58 is a rod 67 of circular cross-section, and the stem portion is a bar 68 of rectangular cross-section. Rod 67 and bar 68 are held together by a short length of rod 69 of greater diameter than rod 67. Rod 69 is diametrically drilled adjacent its lower end to receive the rod 67, equal lengths of the latter projecting from either side of rod 69. The underside of rod 69 is diametrically slotted at right angles to the longitudinal axis of rod 67. The slot extends upwardly part way into the underside of rod 67. The upper end of bar 68 is tightly fitted into this slot. The portion of rod 69 projecting above the head of the T provides a post to receive an adjustable holder for the pipe-end. The upper end of rod 69 has a circumferential V-groove 70.

Head 59 of the T-housing has a central opening 63 in line with and of the same diameter as the bore of tube 58. The ends 64 of the channel head 59 extend above the side pieces 65. Cover plates 66 are connected by screws, not shown, across the top of the channel at each end, abutting the extended portion of the ends.

The T-member 57 comprises a rod 67, forming the head of the T, and a depending flat piece 68 forming the stem. A short cylindrical post 69 is drilled laterally near the bottom to receive the rod 67, upon which it is centrally positioned. The top of stem 68 is tightly fitted into a slot cut transversely of the head through the bottom of the post 69 and extending part way into the rod 67.

The T-member is supported in a suspended or floating position substantially centrally within the housing 56 by pins or struts 71 having their inner ends resting in recesses 72 formed in the T-member, and their outer ends supported by buttons 73 arranged for longitudinal movement within threaded nipples 74 set in the walls of the T-housing and held securely by lock-nuts 75. Each button 73 is restricted in its outward movement by an inner shoulder 76 formed at the end of the nipple. The pins are arranged in pairs, disposed in line on opposite sides of the T-member. Six pairs of pins are used to restrain the T-member from movement. One pair of pins is disposed on the longitudinal axis of the rod 67 to restrain endwise movement in either direction. Each end of the rod 67 has a vertical pair of pins for restraining movement of the rod up or down, and a horizontal pair of pins for restraining movement of the rod forward or back. The groups of pins at the ends of rod 67 act along coordinate lines which intersect at points equidistant from the vertical axis of the stem 68. The sixth pair of pins is arranged horizontally front-and-rear at the lower end of the stem 68, the corresponding nipples being set in the flat portions 62 of the housing tube 58. The nipples 74 are adjusted to permit only slight longitudinal movement of the pins, about .002 of an inch, so that one pin of a pair may transmit a force while the opposite pin is unstressed. Since the pairs of pins are in lines corresponding to the three coordinate axes of the three-dimensional pipe model, six coordinate forces in either the plus or minus direction are transmitted through the pins 71 and the buttons 73 to the shoulders 76 of the nipples 74.

Attached to post 69 is a pipe model holder or clamp 77 to rigidly secure an end of the pipe model 10. Pipe clamp 77 comprises a cap portion 78 angularly adjustable on the post 69 and a block 79 secured to the cap portion by a bolt 80. Cap 78 is secured in its desired position on post 69 by thumb-screw 90 engaging the V-groove 70. Block 79 is drilled to provide openings 81 on its exposed sides to receive the pipe-end in various positions. The pipe-end is rigidly set in the block, as by welding, soldering, or a threaded joint.

The intersection of the horizontal axis of head 67 and the vertical axis of stem 68 serves as a reference point for the measurement of reactions at the clamped end of the pipe model. The group of pins at each end of the head intersect at points on the horizontal axis two and one-half inches from the reference point, and the pair of pins at the bottom of the stem intersect the vertical axis at a point five inches from the reference point. While I have preferred to use these proportions, it is obvious that others may be employed. It is essential, however, that they be accurately determined so that they may be used as factors in subsequent calculations.

Reactions at the clamped end of the pipe are transmitted through the T-member 57, the pins 71, and buttons 73 to the limiting shoulders 76 of the nipples 74. Obviously, only one pin of each pair of pins is stressed. The reaction at the pipe-end is thus resolved into forces which may be measured at the buttons by suitable measuring devices.

The measurement of these forces is accomplished by dial gauges 82 and 83 having suitable connecters 84 and 85 respectively for attachment to the outer threaded portion of nipples 74. The gauges are placed on opposite nipples to measure the force and its direction along each line of pins. The gauges are shown enlarged in Fig. 2 but, for lack of space, they have not been illustrated in their true recording position, that is, on opposite nipples.

Connecter 84 is a sleeve rigidly attached at one end to the shank of the gauge housing, and internally threaded at the other end to receive the end of nipples 74.

Gauge 82 is run up on threaded nipple 74 until its plunger, not shown, bears against the button 73 supporting the unstressed pin, taking up the slack.

Connecter 85 has a plunger 86 provided with a pin 87 at its forward end. Plunger 86 is normally held against an inner shoulder 88 of the connecter by a calibrated spring 89. A cover 91 closes the opposite end of the connecter and forms a bearing surface for the opposite end of spring 89. A central opening in the cover 91 receives for rigid support the shank of gauge 83. The plunger of gauge 83 abuts the end of the connecter plunger 86. The shouldered end of connecter 85 is internally threaded to receive the end of nipple 74.

As the connecter 85 is run up on the nipple 74, the pin 87 bears against the button 73 with increasing force until the latter is lifted from its seat. The force required to do this compresses spring 89 of the connecter. Movement of the indicator needle on the opposite gauge 82 shows when the button has been lifted. The force required to lift the button is indicated on the dial of gauge 83.

By transferring the gauges to each pair of nipples, separate readings are taken on each line of pins. Since each line of pins is parallel to a coordinate axis, the readings will give the forces in either a positive or a negative direction relative to each axis.

In testing a particular pipe line, the initial procedure is to construct a small model scaled to fall within the dimensional limitations of the testing apparatus. Solid rod or tubing, or a combination of these, may be used to form the model, the individual members of which have a degree of elasticity comparable to that possessed by the pipe line. This relationship may be obtained by choosing rod or tubing of such size that the ratios of the products of their moduli of elasticity and their respective movements of inertia are equivalent to those occurring in the actual pipe line.

Before attaching the pipe model to the frame, hand-knob 49 is manipulated so that the axes of posts 27 and 45 coincide. This done, it may be seen from Fig. 2 that the vertical axis of stem 68 coincides with the axes of posts 27 and 45. The pipe model is then secured to the frame in the most convenient position for testing by means of the pipe-clamps 77, care being taken to set up a minimum of stress in the pipe system during the clamping operation. It has been found that the combined movement and measuring heads are best arranged in the position illustrated in Fig. 1, that is, vertically. The pipe model is preferably positioned so that at least one of its sections will be parallel to one of the coordinate axes.

Before the particular pipe-model end under consideration is deflected, a reference point in the pipe system is selected relative to which all the expansion determinations are made. The reference point is preferably one of the pipe ends, but any intermediate point may be used. For the purpose of explanation we will assume that one of the pipe-ends is to be considered the stationary reference point. The following calculations are now made: first, the longitudinal thermal expansion of the corresponding member of the actual pipe system is determined; second, the longitudinal expansion of the actual pipe member is expressed in terms of its counterpart in the model pipe; third, the movement of the pipe-model end relative to the horizontal coordinate axes X and Z is calculated, and the resultant in the horizontal plane formed by these axes determined; fourth, the movement of the pipe-model end relative to the vertical coordinate axis Y is calculated.

Gauge readings are now made and recorded for each of the twelve points of measurement on the T-member, so that the forces exerted as a result of pre-spring or inaccuracies in the model may be determined.

The pipe-model end is deflected in the following manner. The thumb-screws 42 and 60 are loosened so that the horizontal feed mechanism 22 may be rotated freely. The mechanism 22 will rotate easily because of the previous alignment of the measuring-head and movement-head vertical axes. Horizontal feed 22 is rotated until its horizontal feed path has been angularly displaced through the angle of the resultant in the XZ plane, previously calculated. Thumb-screws 42 and 60 are then tightened to prevent further rotation. Thumb-screws 39 and 52 are now loosened and hand-knobs 35 and 49 are manipulated, in any order, to translate the post 45, and with it the measuring head 20, the distances that have been calculated for the resultant and the Y axis. Thumb-screws 39 and 52 are then tightened. The pipe-model end, being rigidly secured to the measuring head, is thus displaced therewith proportionately relative to its counterpart in the actual piping system.

Each anchored end, except the one used as a reference point in determining thermal expansion, is then strained or deflected by its movement head a proportional distance relative to the actual thermal expansion of the pipe. When all the necessary deflections have been made, the measuring and movement heads are rigidly locked by means of the various thumb-screws, and the pipe model is then ready for the measurement of force reactions.

When the pipe model is in its strained position, forces and moments are created at each anchored end of the model. Gauge readings are again taken at each point of measurement. The algebraic sum of the forces acting parallel to each of the coordinate axes must obviously total zero.

The force readings taken in the initial position are subtracted algebraically from the corresponding forces in the deflected position. The difference obtained will give the magnitude and sign of the forces in the pipe model, which are in the same ratio to the forces in the actual pipe as the arbitrary proportional deflection of the model is to the calculated thermal expansion in the actual pipe. The algebraic sum of all the force differences read on one measuring head along any one of the coordinate axes is the total force reaction along that axis at that end of the model. Each individual force difference multiplied by its distance from the end of the pipe model is a component of the reacting moment at the pipe-end.

Fig. 4 shows diagrammatically the force components for the pipe model illustrated in Fig. 1, and Fig. 5 shows diagrammatically the moments to be considered.

Referring to Fig. 4, the measuring points on the heads are represented by arrows, lettered to correspond to the coordinate axes to which they are respectively parallel. Considering the reactions at pipe-end O, there are three force reactions:

$$Fx = Fx_1 + Fx_2 + Fx_3$$
$$Fy = Fy_1 + Fy_2$$
$$Fz = Fz_1$$

and three reacting moments:

$$Mx = d_2 Fy_2 - d_1 Fy_1 - d_4 Fz_1$$
$$My = d_1 Fx_1 - d_2 Fx_2$$
$$Mz = d_4(Fx_1 + Fx_2) + (d_3 + d_4) Fx_3$$

These forces and moments at the end of the pipe model are readily converted to those reacting on the corresponding end of the actual pipe by means of the following relationships:

$$\frac{Fa}{Fm} = \frac{L^3 m}{L^3 a} \times \frac{Ea}{Em} \times \frac{Ia}{Im} \times \frac{\Delta a}{\Delta m}$$

$$\frac{Ma}{Mm} = \frac{L^2 m}{L^2 a} \times \frac{Ea}{Em} \times \frac{Ia}{Im} \times \frac{\Delta a}{\Delta m}$$

in which the subscripts $a$ and $m$ refer to the actual pipe and the model respectively, and:

F = force
M = moment
L = length
I = moment of inertia
$\Delta$ = movement, or expansion Having calculated the moments at the anchored ends of the actual pipe, these may be transferred mathematically to any point on the pipe line, and the stresses determined there.

I claim:

1. In apparatus for determining on a scaled model reactions relative to the three coordinate axes of a three-dimensional piping system, the combination of a frame comprising a pair of spaced uprights, a vertically adjustable cross-bar connected to said uprights, and a plurality of vertically adjustable lateral bars attached at one end to said uprights, each of said lateral bars being rotatable about its respective upright in a plane perpendicular to the axis thereof; means adjustably positioned on said cross-bar and said lateral bars for supporting said pipe model by its ends; means for individually deflecting the supported pipe-ends whereby with relation to a predetermined fixed end predetermined strains may be produced at the remaining ends to set up reactions at each of the supports; means for resolving said reactions into measurable components; and means for measuring said components.

2. In apparatus for determining on a scaled model reactions relative to the three coordinate axes of a three-dimensional piping system, the combination of a frame for supporting the pipe model; a movement head adjustably mounted on said frame, said movement head including a frame clamp member, a measuring-head support member, and cross-feed means interengaging said members for both laterally and longitudinally displacing said measuring-head support member; and a measuring head mounted on said support member rotatably positionable relative to the longitudinal axis thereof, said measuring head including means for rigidly securing the pipe-end to be tested, means for resolving reactions at said pipe-end into measurable forces relative to said coordinate axes, and means for measuring said forces.

3. In apparatus for determining on a scaled model reactions relative to the three coordinate axes of a three-dimensional piping system, the combination of a frame; a frame clamp adjustably mounted on said frame, said clamp having a longitudinal guideway; a post movable axially along said guide-way; a feed-screw interconnecting said post and said frame clamp; a block mounted upon said post, angularly adjustable about the axis thereof, and having a perpendicularly transverse guideway relative to said longitudinal guideway; a plate movable along said transverse guideway; a second feed-screw interconnecting said plate and said block; a second post secured to said plate with its axis parallel to the axis of the first post, said second post being movable by said second feed-screw radially with respect to said first post axis; and a measuring head mounted on said second post comprising means for rigidly securing the pipe-end to be tested, means for resolving reactions at said pipe-end into measurable forces in either direction relative to said coordinate axes, and means for measuring said forces.

4. Force-measuring apparatus for determining reactions relative to three coordinate axes at the end of a stressed member comprising a T-member having means centrally positioned on its head for rigidly securing thereto the end of the stressed member, the head and stem portions of said T having intersecting longitudinal axes, a housing for said T-member, pairs of pins supported at their outer ends by said housing and adapted at their inner ends to resist translatory and angular displacement of said T-member, the pins of each pair being arranged in line at opposite sides of said T-member, one of said pairs of pins being disposed at opposite ends of said head along the head axis, two of said pairs of pins being disposed at the ends of said head above and below the head axis, and three of said pairs of pins being disposed at the ends of said head and said stem in front and in back of the head and stem axes, whereby the reactions at the end of said member are resolved into forces acting in either direction relative to said coordinate axes, and means for measuring said forces.

5. In apparatus of the character described, the combination of a frame adjustable to provide points of support for the ends of a branched, three-dimensional piping system; members rigidly secured to each of said ends; a housing for each of said members; pins supporting said members within their respective housings, said pins being disposed longitudinally along coordinate lines and engaging said housing to resist movement of said members in either direction therealong; means between said frame and said housings for deflecting the latter to set up stresses at said points of support; and means for measuring the force reactions at each of said pins.

DAVID B. ROSSHEIM.

CERTIFICATE OF CORRECTION.

Patent No. 2,348,926.                    May 16, 1944.

DAVID B. ROSSHEIM.

It is hereby certified that error appears in the printed specification of the above numbered patent requiring correction as follows: Page 2, second column, line 65, after the word and period "place." insert the following paragraph -

>   --Tube 58 has front and rear flat portions 62 near the lower end, and is suitably reenforced at that point by additional wall thickness.--;

line 66, beginning with "The head portion" strike out all to and including "V-groove 70.", page 3, first column, line 7, and insert the same paragraph after "ends.", same page 3, first column, line 14; line 15, beginning with "The T-member" strike out all to and including "rod 67.", line 23; and that the said Letters Patent should be read with this correction therein that the same may conform to the record of the case in the Patent Office.

Signed and sealed this 12th day of September, A. D. 1944.

Leslie Frazer (Seal)                       Acting Commissioner of Patents.